US012737171B2

(12) United States Patent
Miyazawa et al.

(10) Patent No.: US 12,737,171 B2
(45) Date of Patent: Sep. 15, 2026

(54) INFORMATION PROCESSING DEVICE FOR VEHICLE, SOFTWARE UPDATE SYSTEM FOR VEHICLE, AND NON-TRANSITORY STORAGE MEDIUM

(71) Applicant: TOYOTA JIDOSHA KABUSHIKI KAISHA, Toyota (JP)

(72) Inventors: Tomoaki Miyazawa, Nagoya (JP); Ryota Nakabayashi, Nagoya (JP); Naoki Yomoda, Toyota (JP); Atsushi Mori, Miyoshi (JP); Hiroshi Inoue, Nagoya (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 18/588,696

(22) Filed: Feb. 27, 2024

(65) Prior Publication Data

US 2024/0311130 A1 Sep. 19, 2024

(30) Foreign Application Priority Data

Mar. 13, 2023 (JP) ................................ 2023-038711

(51) Int. Cl.
*G06F 8/65* (2018.01)
*B60N 2/00* (2006.01)
*B60W 50/14* (2020.01)

(52) U.S. Cl.
CPC ............ *G06F 8/65* (2013.01); *B60N 2/0021* (2023.08); *B60W 50/14* (2013.01);
(Continued)

(58) Field of Classification Search
CPC .......... B60N 2/0021; B60W 2050/143; B60W 2050/146; B60W 2540/215; B60W 50/14; G06F 8/65
(Continued)

(56) References Cited

U.S. PATENT DOCUMENTS 8,813,061 B2 * 8/2014 Hoffman .................. G06F 8/65 717/172
11,467,818 B2 * 10/2022 Teraoka ................ B60L 3/0061
(Continued)

FOREIGN PATENT DOCUMENTS

JP 2011-053954 A 3/2011
JP 2020-027620 A 2/2020
(Continued)

OTHER PUBLICATIONS

Ross Froat, "Over-The-Air (OTA) ECU Updating", 2014, TMC Connect, 4 pages. (Year: 2014).*
(Continued)

*Primary Examiner* — Ted T. Vo
(74) *Attorney, Agent, or Firm* — Oliff PLC

(57) ABSTRACT

An information processing device is for a vehicle. The information processing device includes one or more processors configured to: receive update software for an electronic control device mounted on the vehicle; perform an update of software of the electronic control device to the update software; determine whether an occupant is present in a vehicle cabin of the vehicle; make a notification before update to the update software is started when determining that the occupant is present in the vehicle cabin, the notification being made to allow the occupant to select whether to start the update to the update software; and start the update to the update software without making the notification when determining that no occupant is present in the vehicle cabin.

6 Claims, 3 Drawing Sheets

(52) U.S. Cl.
CPC . *B60W 2050/143* (2013.01); *B60W 2050/146* (2013.01); *B60W 2540/215* (2020.02)

(58) Field of Classification Search
USPC .................................................. 717/168–178
See application file for complete search history.

(56) References Cited

U.S. PATENT DOCUMENTS

| | | | | |
|---|---|---|---|---|
| 11,782,692 | B2 * | 10/2023 | McFarland, Jr. .... | G06Q 10/063 717/173 |
| 2013/0197712 | A1 | 8/2013 | Matsuura et al. | |
| 2021/0157529 | A1 | 5/2021 | Sakurai et al. | |
| 2023/0384478 | A1 * | 11/2023 | Roberts ............... | G06F 18/2431 |

FOREIGN PATENT DOCUMENTS

| | | | |
|---|---|---|---|
| JP | 2021-026252 | A | 2/2021 |
| WO | 2012/017719 | A1 | 2/2012 |

OTHER PUBLICATIONS

Ford Motor Company, "Ford Makeovers: Quick, Seamless Over-The-Air Software Updates Help Keep Vehicle Tech Current", 2019, retrieved from https://corporate.ford.com//articles/products/over-the-air-software-updates/, 4 pages. (Year: 2019).*

* cited by examiner

FIG. 4
| PATTERN A | ON | OCCUPANT PRESENT |
|---|---|---|
| PATTERN B | OFF | OCCUPANT PRESENT |
| PATTERN C | OFF | NO OCCUPANT |
FIG. 5
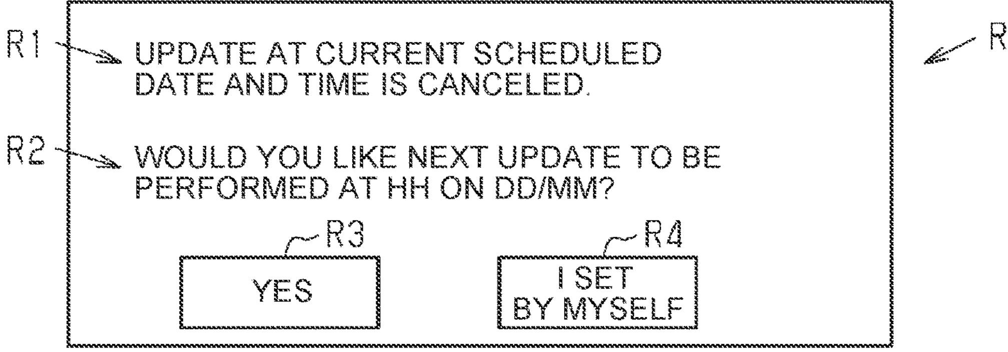
FIG. 6
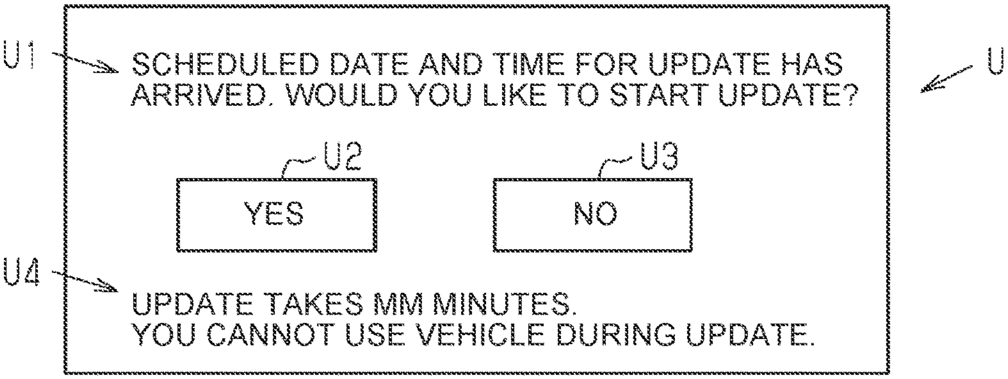
FIG. 7
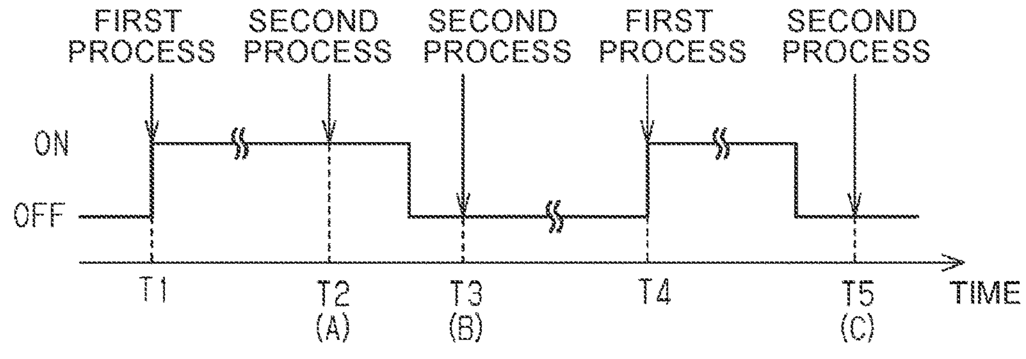

INFORMATION PROCESSING DEVICE FOR VEHICLE, SOFTWARE UPDATE SYSTEM FOR VEHICLE, AND NON-TRANSITORY STORAGE MEDIUM

CROSS-REFERENCE TO RELATED APPLICATION

This application claims priority to Japanese Patent Application No. 2023-038711 filed on Mar. 13, 2023 incorporated herein by reference in its entirety.

BACKGROUND

1. Technical Field

This disclosure relates to an information processing device for a vehicle, a software update system for a vehicle, and a non-transitory storage medium.

2. Description of Related Art

Japanese Unexamined Patent Application Publication No. 2021-026252 (JP 2021-026252 A) discloses a software update system including a server and a terminal. The server and the terminal are communicably connected to each other via a communication network. The server transmits data for updating software of the terminal to the terminal when a predetermined date and time arrives. Upon receiving the transmitted data, the terminal updates its software.

SUMMARY

Software of an electronic control device installed in a vehicle is occasionally updated. Update of software in a vehicle is performed while a system of the vehicle is turned off. Thus, the vehicle cannot be driven while the software is being updated. Therefore, if the time when a user desires to use the vehicle overlaps the time of software update, the user cannot use the vehicle until the software update is finished.

An information processing device for a vehicle according to a first aspect of the present disclosure includes one or more processors configured to: receive update software for an electronic control device mounted on the vehicle; perform an update of software of the electronic control device to the update software; determine whether an occupant is present in a vehicle cabin of the vehicle; make a notification before the update to the update software is started when determining that the occupant is present in the vehicle cabin, the notification being made to allow the occupant to select whether to start the update to the update software; and start the update to the update software without making the notification when determining that no occupant is present in the vehicle cabin.

A software update system for a vehicle according to a second aspect of the present disclosure includes: a first device configured to detect presence of an occupant in a vehicle cabin of the vehicle; a second device configured to notify the occupant present in the vehicle cabin of information by using light or sound; a third device configured to receive an instruction from the occupant in the vehicle cabin; an electronic control device mounted on the vehicle; and an information processing device mounted on the vehicle to control an update of software for the electronic control device, the information processing device being configured to: receive update software for the electronic control device; perform the update of the software of the electronic control device to the update software; determine whether the occupant is present in the vehicle cabin based on a detection result from the first device; when determining that the occupant is present in the vehicle cabin, make a notification using the second device before the update to the update software is started, the notification being made to allow the occupant to select whether to start the update to the update software, and start the update to the update software on condition that a signal indicating that the update to the update software has been accepted is acquired from the third device after the notification is made; and when determining that no occupant is present in the vehicle cabin, start the update to the update software without making the notification.

A non-transitory storage medium according to a third aspect of the present disclosure stores instructions that are executable by an information processing device and that cause the information processing device to execute functions. The information processing device being mounted on a vehicle together with an electronic control device and configured to control an update of software for the electronic control device. The functions comprising: receiving update software for the electronic control device; performing the update of the software of the electronic control device to the update software; determining whether an occupant is present in a vehicle cabin of the vehicle; making a notification before the update to the update software is started when determining that the occupant is present in the vehicle cabin, the notification being made to allow the occupant to select whether to start the update to the update software; and starting the update to the update software without making the notification when determining that no occupant is present in the vehicle cabin.

With the above technical idea, it is possible to suppress update of software being started when an occupant desires to use a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a table for patterns of situations at the time to start the second process;

FIG. 5 illustrates an example of a re-determination image;

FIG. 6 illustrates an example of a selection image; and

FIG. 7 is a time chart illustrating an example of execution timings of the first process and the second process.

DETAILED DESCRIPTION OF EMBODIMENTS

A software update system for a vehicle, including an information processing device for a vehicle, according to an embodiment will be described below with reference to the drawings.

Schematic Configuration of Vehicle

Figure 1:
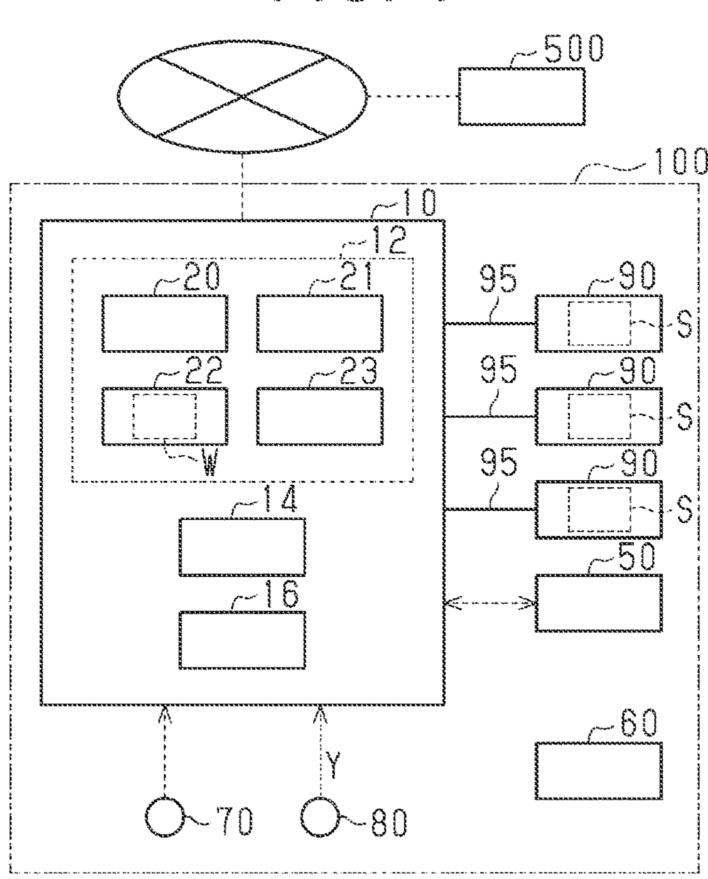
FIG. 1 illustrates a schematic configuration of a vehicle.

As illustrated in FIG. 1, a vehicle 100 includes an over-the-air (OTA) master 10. The OTA master 10 includes a processing circuit 12. The processing circuit 12 includes a central processing unit (CPU) 20, a first memory 21, a second memory 22, and a third memory 23. The first memory 21 is a non-volatile storage medium. The first memory 21 is electrically rewritable. The first memory 21 functions as a storage that stores data received from the outside, for example. The second memory 22 is a non-volatile storage medium. The second memory 22 is electrically rewritable. The second memory 22 stores various types of software. One piece of the software is a program W that describes processes to be executed by the CPU 20. The software includes various data necessary for the CPU 20 to execute the program W. The third memory 23 is a volatile storage medium. The OTA master 10 includes a communication module 14. The communication module 14 is a communication circuit for wireless communication with the outside via an external communication line network. The OTA master 10 includes a real-time clock 16. The real-time clock 16 is a circuit that generates date and time information. The OTA master 10 is an information processing device mounted on the vehicle 100. The OTA master 10 is also an electronic control device mounted on the vehicle 100.

The vehicle 100 includes a plurality of specific control devices 90. In FIG. 1, three of the specific control devices 90 are illustrated as representatives. The specific control devices 90 are each an electronic control device that controls a specific one of a plurality of in-vehicle devices. One of the in-vehicle devices is an engine as a drive source of the vehicle 100. Another of the in-vehicle devices is a hydraulic brake device. Thus, examples of the specific control devices 90 described above include an engine electronic control unit (ECU) and a brake ECU. Other examples of the in-vehicle devices include an air-conditioning device, a meter display device, a car navigation device, an audio device, and a blinker device. Unique identifier numbers are allocated in advance to the specific control devices 90. The specific control devices 90 can communicate with the OTA master 10 via respective buses 95.

The specific control devices 90 each include a processing circuit that is similar to that of the OTA master 10. That is, the specific control devices 90 each include a CPU, a non-volatile first memory, a non-volatile second memory, and a volatile third memory. The second memory stores various types of software S for controlling target in-vehicle devices. The non-volatile memories adopted in the present embodiment, including those of the OTA master 10, are of a double-bank structure. The memories of the double-bank structure include two storage areas. This allows writing data into one of the storage areas while reading data from the other storage area.

The vehicle 100 includes a plurality of pressure sensors 80. In FIG. 1, one of the pressure sensors 80 is illustrated as a representative. The pressure sensor 80 is provided for each seat in the vehicle 100. The pressure sensor 80 is attached to the seat to be seated by an occupant. The pressure sensor 80 detects a seat pressure Y as a pressure that acts on the seat. The pressure sensor 80 is connected to the OTA master 10. The pressure sensor 80 outputs the detected seat pressure Y to the OTA master 10. The pressure sensor 80 is a first device that detects the presence of an occupant in a vehicle cabin of the vehicle 100.

The vehicle 100 includes a display 50. The display 50 is positioned in the vehicle cabin of the vehicle 100. The display 50 includes a drive circuit and a display screen. The display 50 is connected to the OTA master 10. The display 50 displays an image that matches an instruction signal output by the CPU 20 of the OTA master 10 on the display screen. The display 50 is a touch panel type. That is, when an occupant performs an input operation on the display screen of the display 50, the display 50 outputs a signal that matches the input operation to the OTA master 10. Thus, the display 50 is a second device that notifies an occupant that is present in the vehicle cabin of information using light. The display 50 is also a third device that receives an instruction from an occupant in the vehicle cabin.

The vehicle 100 includes an ignition switch 70. The ignition switch 70 is a switch for an occupant to provide an instruction to activate the vehicle 100. A system of the vehicle 100 is turned on and off when an occupant performs an operation to turn on and off the ignition switch 70. The ignition switch 70 is occasionally referred to as a start switch or a system activation switch.

The vehicle 100 includes a battery 60. The battery 60 supplies power to the OTA master 10, the specific control devices 90, the display 50, the pressure sensors 80, and the ignition switch 70. This enables the in-vehicle components to operate as follows. The OTA master 10 is continuously activated in the background not only when the system of the vehicle 100 is turned on but also when the system of the vehicle 100 is turned off. This is also true of the pressure sensors 80. The specific control devices 90 and the display 50 are continuously activated when the system of the vehicle 100 is turned on, and basically stop operation when the system of the vehicle 100 is turned off. However, the specific control devices 90 and the display 50 are temporarily activated according to an instruction from the CPU 20 of the OTA master 10 even when the system of the vehicle 100 is turned off. In this manner, the specific control devices 90 are activated in a state in which the system of the vehicle 100 is turned on. The state in which the system of the vehicle 100 is turned on includes a state in which the vehicle 100 can travel and a so-called accessory-on state. In the accessory-on state, the vehicle 100 cannot travel, but some of the in-vehicle components can be used. On the other hand, the specific control devices 90 are not activated in a state in which the system of the vehicle 100 is turned off. The OTA master 10 receives a signal that indicates the state of the vehicle 100 that matches an operation to turn on and off the ignition switch 70. This allows the OTA master 10 to grasp whether the system of the vehicle 100 is turned on or off.

The plurality of in-vehicle components described above, including the OTA master 10, the specific control devices 90, the display 50, the pressure sensors 80, the ignition switch 70, and the battery 60, constitute a software update system for a vehicle.

OTA Server

An OTA server 500 is a management server provided outside the vehicle 100. The OTA server 500 manages information on software for a plurality of vehicles registered in advance. The OTA server 500 stores the latest software that is applicable to each of the vehicles according to the vehicle model and type, for example. The OTA server 500 notifies each vehicle of the presence or absence of new update software that is applicable to the vehicle and transmits the new update software to the target vehicle in response to a request from the vehicle.

Overview of Functions of OTA Master

The CPU 20 of the OTA master 10 can execute a first process and a second process by executing the program W stored in the second memory 22. The first process and the second process are processes for controlling update of software in the specific control devices 90. The CPU 20 updates software for the specific control devices 90 using wireless communication by performing the first process and the second process. A technique of updating software using wireless communication is occasionally referred to as "Over The Air (OTA)".

In the first process, the CPU 20 downloads update software for a specific control device 90. That is, the CPU 20 receives update software from the OTA server 500, and stores the received update software in the first memory 21. In the first process, in addition, the CPU 20 installs the update software in the target specific control device 90. That is, the CPU 20 stores the update software in the second memory of the target specific control device 90.

In the second process, the CPU 20 updates software for the specific control device 90 to the update software when a scheduled date and time determined in advance arrives. The CPU 20 makes an advance notification of this update for an occupant in some cases, and does not make such an advance notification in the other cases. The advance notification allows an occupant to select whether to start the update to the update software. The CPU 20 grasps the presence or absence of an occupant in the vehicle cabin as information for determining whether to make an advance notification. Specifically, the CPU 20 determines whether an occupant is present in the vehicle cabin based on the detection results from the pressure sensors 80. When the CPU 20 determines that an occupant is present in the vehicle cabin when a scheduled date and time for update has arrived, the CPU 20 makes an advance notification before the update to the update software is started. In this case, the CPU 20 starts the update to the update software on condition that a signal indicating that the update to the update software has been accepted is acquired from the display 50 according to an operation by the occupant after the advance notification is made. When the CPU 20 determines that no occupant is present in the vehicle cabin, on the other hand, the CPU 20 starts the update to the update software without making an advance notification. When a signal indicating that the update to the update software has been refused is acquired from the display 50 according to an operation by the occupant after the advance notification is made, the CPU 20 makes a notification of a new candidate for a scheduled date and time for the update to the update software using the display 50. Meanwhile, the CPU 20 starts the update to the update software when the CPU 20 determines that there is no occupant in the vehicle cabin any more, even if a signal indicating that the update to the update software has been accepted is not acquired from the display 50, after the advance notification is made.

The update to the update software corresponds to activating the update software. That is, the update to the update software corresponds to making changes to the settings of the specific control device 90 so as to perform a process with reference to the update software. The update to the update software is occasionally referred to as activation. In the present embodiment, the update to the update software is performed while the system of the vehicle 100 is turned off. That is, the update to the update software is performed without the specific control devices 90 being activated, excluding the specific control device 90 as the update target. Setting is made to temporarily activate the specific control device 90 as the update target only when an update process is performed, even when the system of the vehicle 100 is turned off.

Method of Calculating Scheduled Date and Time

In the first process and the second process, the CPU 20 occasionally suggests a scheduled date and time for the update to the update software. A method for the CPU 20 to calculate a scheduled date and time at this time will be described. As a premise, the CPU 20 stores the following necessary data in the first memory 21 at all times. The necessary data include the time when the system of the vehicle 100 was turned on and the time when the system of the vehicle 100 was turned off, between the present time and a time a certain period determined in advance earlier. The certain period may be one month, for example. The CPU 20 calculates a candidate date for a new scheduled date and time based on the necessary data. Specifically, the CPU 20 calculates the most frequent time when the system of the vehicle 100 was turned off most frequently during the certain period. At this time, the CPU 20 calculates the most frequent time by dividing a day into 24 time units. When there is a plurality of most frequent times, the CPU 20 treats one of the most frequent times that is the closest to 00:00 a.m. as the most frequent time. When the most frequent time is calculated, the CPU 20 calculates a date when the most frequent time is reached the earliest with reference to the present time. Then, the CPU 20 determines the most frequent time on the calculated date as a candidate for a scheduled date and time.

Specific Process Procedure of First Process

Figure 2:
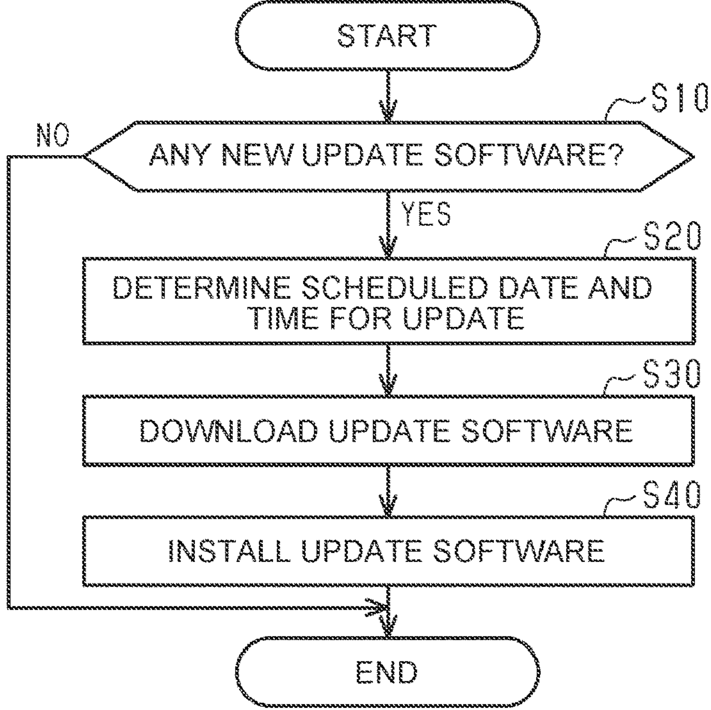
FIG. 2 is a flowchart illustrating a process procedure of a first process.

The CPU 20 starts the first process when the system of the vehicle 100 is switched from off to on. As illustrated in FIG. 2, the CPU 20 first executes the process in step S10 when the first process is started. In step S10, the CPU 20 determines whether new update software that is applicable to the vehicle 100 is present. Specifically, the CPU 20 first transmits a request to confirm the presence or absence of new update software to the OTA server 500 using wireless communication. When a notification indicating that no new update software is present is received from the OTA server 500 as a response to this request (step S10: NO), the CPU 20 ends the first process. When a notification indicating that new update software is present is received from the OTA server 500 (step S10: YES), on the other hand, the CPU 20 advances the process to step S20.

In step S20, the CPU 20 determines a scheduled date and time for update of software. The CPU 20 determines a scheduled date and time for update by suggesting a scheduled date and time through the display 50 or receiving a date and time input to the display 50 by an occupant himself/herself. At this time, the CPU 20 suggests a scheduled date and time calculated using the date and time calculation method described above. When a scheduled date and time for update is determined, the CPU 20 stores the date and time in the first memory 21. After that, the CPU 20 advances the process to step S30.

In step S30, the CPU 20 downloads update software. Specifically, the CPU 20 requests the OTA server 500 to transmit update software. When a distribution package of update software is received from the OTA server 500 in response to this request, the CPU 20 stores the received distribution package in the first memory 21. The distribution package includes update software for a number of specific control devices 90 as the update target. The update software includes information on the identification number of the specific control device 90 as the update target and the data volume of the update software. The CPU 20 reads such information when the package of update software is downloaded. Then, the CPU 20 stores the information read from the update software in the first memory 21 as a set of update information. When the above process is performed, the CPU 20 advances the process to step S40.

In step S40, the CPU 20 installs the update software downloaded in step S30. Specifically, the CPU 20 specifies a specific control device 90 as the target for update software by referencing the update information. Then, the CPU 20 transmits the update software and an instruction signal that provides an instruction to store the update software to the specified specific control device 90. The specific control device 90 as the update target stores the update software in the second memory of the specific control device 90 itself in response to this instruction signal. The CPU 20 ends the first process when the update software is installed in the specific control device 90 as the update target in the manner described above. The CPU 20 completes the above first process quickly while the system of the vehicle 100 is turned on.

Different update software may be downloaded and installed in the first process again after the update software is downloaded and installed through the first process and before the update to the update software is performed through the second process to be described later. In such a case, the CPU 20 suggests the scheduled date and time for update already stored in the first memory 21 in step S20 of the first process. When an occupant desires a different date and time, the date and time is stored in the first memory 21 as the latest scheduled date and time. When a new date and time is stored in the first memory 21, the CPU 20 deletes the scheduled date and time that has been stored so far. Thus, the CPU 20 holds information on the latest scheduled date and time in the first memory 21 at all times. Then, the CPU 20 collectively updates software that has been downloaded and installed but that has not been updated yet in the second process.

Specific Process Procedure of Second Process

When the first memory 21 stores a scheduled date and time for update, the CPU 20 makes a comparison between this date and time and information on the actual date and time generated by the real-time clock 16 at all times. Then, the CPU 20 starts the second process when the actual date and time matches the scheduled date and time. The situation at this time may fall into the following three patterns indicated in FIG. 4. In a pattern A, an occupant is using the vehicle 100 with the system of the vehicle 100 turned on. In a pattern B, an occupant is staying in the vehicle cabin with the system of the vehicle 100 turned off. In a pattern C, no occupant is present in the vehicle cabin with the system of the vehicle 100 turned off.

Figure 3:
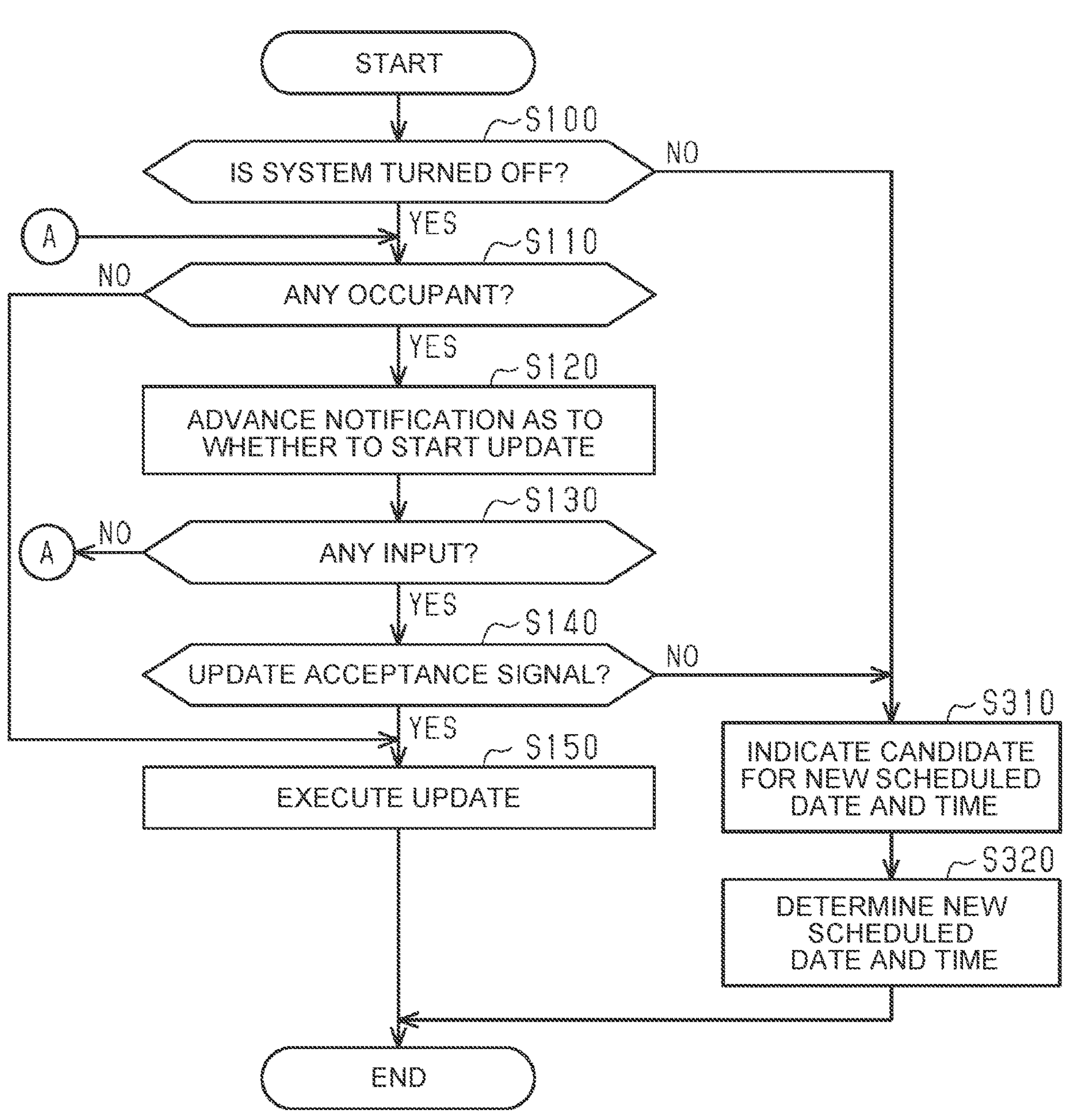
FIG. 3 is a flowchart illustrating a process procedure of a second process.

As illustrated in FIG. 3, when the second process is started, the CPU 20 first executes the process in step S100. In step S100, the CPU 20 determines whether the system of the vehicle 100 is turned off. When the system of the vehicle 100 is turned on (step S100: NO), the CPU 20 advances the process to step S310. The situation in which the determination in step S100 is NO corresponds to the above pattern A.

In step S310, the CPU 20 makes a notification of a candidate for a new scheduled date and time at which the update to the update software is to be performed using the display 50. Specifically, the CPU 20 transmits an instruction signal for displaying a re-determination image R to the display 50. The display 50 displays the re-determination image R in response to this instruction signal. As illustrated in FIG. 5, the re-determination image R includes the following plurality of display contents. A first display content is a message R1 saying that update at the present scheduled date and time is canceled. A second display content is a message R2 that presents a candidate for a new scheduled date and time and that asks whether an occupant accepts the candidate. The CPU 20 calculates a new scheduled date and time by the date and time calculation method described already. A third display content is an acceptance button R3 for the occupant to accept the candidate for a new scheduled date and time. The acceptance button R3 can receive an input operation from the occupant. A fourth display content is a refusal button R4 for the occupant to refuse the candidate for a new scheduled date and time. The refusal button R4 can receive an input operation from the occupant. When the refusal button R4 is operated, the occupant is allowed to enter a new scheduled date and time by himself/herself. As illustrated in FIG. 3, when the re-determination image R is displayed on the display 50, the CPU 20 advances the process to step S320.

In step S320, the CPU 20 determines a new scheduled date and time. Here, the display 50 has been set to function as follows in response to an operation by the occupant on the re-determination image R. That is, when the occupant has operated the acceptance button R3, the display 50 outputs a schedule acceptance signal indicating that the candidate for a new scheduled date and time has been accepted to the OTA master 10. When the occupant operates the refusal button R4 and enters a candidate for a new date and time by himself/herself, meanwhile, the display 50 outputs a signal that matches the information entered by the occupant to the OTA master 10. In step S320, when a schedule acceptance signal is received, the CPU 20 determines the candidate for a date and time suggested in step S310 as a new scheduled date and time. When information on the scheduled date and time input by the occupant himself/herself is received, on the other hand, the CPU 20 determines the date and time as a new scheduled date and time. When a new scheduled date and time is determined, the CPU 20 stores the scheduled date and time in the first memory 21. At this time, the CPU 20 deletes the scheduled date and time that has been stored so far. The CPU 20 ends the second process when the new scheduled date and time is stored in the first memory 21. When the second process is ended by way of the process in step S320, the CPU 20 executes the second process again when the actual date and time coincides with the new scheduled date and time determined in step S320.

In step S100, when the system of the vehicle 100 is turned off (step S100: YES), the CPU 20 advances the process to step S110. The situation in which the result of the determination in step S100 is YES is either the pattern B in which an occupant is staying in the vehicle cabin with the system of the vehicle 100 turned off or the pattern C in which no occupant is present in the vehicle cabin with the system of the vehicle 100 turned off.

In step S110, the CPU 20 determines whether an occupant is present in the vehicle cabin. The CPU 20 determines that an occupant is present in the vehicle cabin when at least one of the latest seat pressures Y detected by the pressure sensors 80 is equal to or more than a predetermined pressure. When the latest seat pressures Y detected by the pressure sensors 80 are all less than the predetermined pressure, on the other hand, the CPU 20 determines that no occupant is present in the vehicle cabin. The predetermined pressure is a value that allows grasping an occupant being seated on a seat. After the CPU 20 determines in step S110 that no occupant is present in the vehicle cabin (step S110: NO), the CPU 20 advances the process to step S150.

In step S150, the CPU 20 executes update of software for the specific control device 90 as the update target. Specifically, the CPU 20 references the update information stored in the first memory 21. Then, the CPU 20 specifies the specific control device 90 as the update target. Then, the CPU 20 transmits an instruction signal that instructs the specific control device 90 as the update target to start the update to the update software. The specific control device 90 as the update target performs the update to the update software in response to this instruction signal. The content of the update is as described already. When the specific control device 90 as the update target performs the update, the CPU 20 deletes the update information from the first memory 21. At the same time, the CPU 20 deletes the scheduled date and time for update from the first memory 21. The above is the process in step S150. When the process in step S150 is executed, the CPU 20 ends the second process.

When the CPU 20 determines in step S110 that an occupant is present in the vehicle cabin (step S110: YES), on the other hand, the CPU 20 advances the process to step S120. In step S120, the CPU 20 makes an advance notification using the display 50 to cause the occupant to select whether to start the update to the update software. Specifically, the CPU 20 transmits an instruction signal for displaying a selection image U to the display 50. The display 50 displays a selection image U in response to this instruction signal. As illustrated in FIG. 6, the selection image U includes the following plurality of display contents. A first display content is a message U1 saying that a date and time scheduled for update has come and asking whether update may be started. A second display content is an acceptance button U2 for the occupant to select to start update. The acceptance button U2 can receive an input operation from the occupant. A third display content is a refusal button U3 for the occupant to refuse to start update. The refusal button U3 can receive an input operation from the occupant. A fourth display content is a message U4 indicating an estimated value of the length of time required for update and saying that the vehicle 100 cannot be used during update. An estimated value of the length of time required for update can be grasped from the data volume of update software in the update information. As illustrated in FIG. 3, when the above selection image U is displayed on the display 50, the CPU 20 advances the process to step S130.

In step S130, the CPU 20 determines whether the occupant has performed an input operation in response to the advance notification made in step S120. Here, the display 50 has been set to function as follows in response to an input operation by the occupant on the selection image U. That is, when the occupant has operated the acceptance button U2, the display 50 outputs an update acceptance signal indicating that the update to the update software has been accepted to the OTA master 10. When the occupant has operated the refusal button U3, meanwhile, the display 50 outputs an update refusal signal indicating that the update to the update software has been refused to the OTA master 10. In step S130, the CPU 20 determines which of the update acceptance signal and the update refusal signal has been acquired. When none of the signals has been acquired (step S130: NO), the CPU 20 returns to the process in step S110.

The process flow to return from step S130 to step S110 has been incorporated on the assumption of the following case. For example, when the CPU 20 starts the second process just before the occupant gets off the vehicle 100, there may be a situation in which the occupant is present in the vehicle cabin at the time of execution of the first step S110 but the occupant is not present in the vehicle cabin after that. Such a situation can be grasped in the second and subsequent determinations in step S110. When no occupant is present in the vehicle cabin at the time of the second and subsequent executions of step S110 (step S110: NO), the CPU 20 advances the process to step S150. That is, the CPU 20 starts the update to the update software when the CPU 20 determines that there is no occupant in the vehicle cabin any more, even if an update acceptance signal is not acquired from the display 50, after the advance notification is made in step S120. As described above, the CPU 20 ends the second process after the process in step S150 is executed.

In step S130, when the update acceptance signal or the update refusal signal is received from the display 50 (step S130: YES), the CPU 20 advances the process to step S140. The following two flows are conceivable for the case where the process advances to step S140. That is, there may be a case where the determination in step S130 turns YES while the process is repeatedly following a loop of returning from step S130 to step S110 as described above and advancing to step S120 and further to step S130 again. There may be another case where the determination in step S130 turns YES immediately when the process advances to step S130 as the determination in the first step S110 is YES. The timing when the determination in step S130 turns YES depends on the timing when the occupant performs an input operation. The occupant may get off the vehicle while the above loop is repeatedly performed. In this case, the determination in step S110 turns NO. The process flow in this case is as described already.

In step S140, the CPU 20 determines whether the signal acquired from the display 50 is an update acceptance signal. When the signal acquired from the display 50 is not an update acceptance signal, that is, when the signal acquired from the display 50 is an update refusal signal (step S140: NO), the CPU 20 advances the process to step S310. Then, the CPU 20 executes the process in step S310 described above. That is, when an update refusal signal is acquired after the advance notification is made, the CPU 20 indicates a candidate for a new scheduled date and time for the update to the update software using the display 50. After that, the CPU 20 determines the new scheduled date and time through the process in step S320 described above. After that, the CPU 20 ends the second process.

In step S140, when the signal acquired from the display 50 is an update acceptance signal (step S140: YES), on the other hand, the CPU 20 advances the process to step S150. Then, the CPU 20 executes the process in step S150 described above. That is, the CPU 20 starts the update to the update software on condition that an update acceptance signal is acquired after the advance notification is made. When the process in step S150 is executed, the CPU 20 ends the second process.

Functions of Embodiment

It is assumed that, as illustrated in FIG. 7, the system of the vehicle 100 is switched from off to on and the CPU 20 downloads and installs update software through the first process at time T1. It is assumed that, when a scheduled date and time T2 for update of software arrives after that, the situation is in the pattern A in which an occupant is using the vehicle 100 with the system of the vehicle 100 turned on (step S100: NO). In this case, when the second process is started, the CPU 20 advances the process to step S310. That is, the CPU 20 does not execute the update to the update software, and indicates and determines a candidate for a new scheduled date and time (step S310, step S320). It is assumed that, after that, the occupant has ended the use of the vehicle 100. Then, it is assumed that a new scheduled date and time T3 has arrived when the situation is in the pattern B in which an occupant is staying in the vehicle cabin with the system of the vehicle 100 turned off (step S100: YES, step S110: YES). In this case, when the second process is started, the CPU 20 advances the process to step S120 and makes an advance notification. When the occupant operates the acceptance button U2 in response to this advance notification (step S130: YES, step S140: YES), the CPU 20 executes the update to the update software (step S150).

It is assumed that the system of the vehicle 100 is switched from off to on and the CPU 20 downloads and installs update software through the first process at a certain time T4 different from the above occasion. It is assumed that, when a scheduled date and time T5 for update of software arrives after that, the situation is in the pattern C in which no occupant is present in the vehicle cabin with the system of the vehicle 100 turned off (step S100: YES, step S110: NO). In this case, the CPU 20 executes the update to the update software immediately when the second process is started (step S150).

Effects of Embodiment (1) As described in relation to the above functions, when an occupant is present in the vehicle cabin when a scheduled date and time for update of software arrives, the CPU 20 first confirms with the occupant whether to start update before update of software is started. This makes it possible to suppress update of software being started when the occupant desires to use the vehicle 100. When no occupant is present in the vehicle cabin when a scheduled date and time for update of software arrives, on the other hand, the CPU 20 immediately starts update of software. Thus, it is possible to suppress update being postponed even when no occupant is present in the vehicle cabin.

(2) When the occupant refuses to update software in response to an advance notification, the CPU 20 temporarily postpones update of software. It is assumed that the occupant is allowed to manually update software after update of software is temporarily postponed, for example. In this case, the occupant may forget to update software. In this respect, the CPU 20 according to the present embodiment indicates a candidate for a new scheduled date and time (step S310) at the time when update of software is postponed (step S140: NO). A new scheduled date and time can be set by indicating a candidate for a new date and time at the time when update of software is postponed. Thus, software can be reliably updated on a different occasion even when update of software is temporarily postponed.

(3) A scheduled date and time for update may arrive immediately before the occupant gets off the vehicle after the use of the vehicle 100, for example. In such a case, the CPU 20 makes an advance notification (step S120), since the occupant is present in the vehicle cabin (step S110: YES) at the time when the scheduled date and time for update has arrived. In such a case, however, the occupant may get off the vehicle without noticing the advance notification, since the advance notification is made immediately before the occupant gets off the vehicle. In this respect, the CPU 20 according to the present embodiment immediately executes the update to the update software (step S150) when determining that no occupant is present in the vehicle cabin (step S110: NO) after the advance notification is made. Thus, software can be reliably updated without postponing update of software even in the case where a scheduled date and time for update arrives immediately before the occupant gets off the vehicle.

Modifications

The above embodiment can be modified as follows. The above embodiment and the following modifications can be combined with each other as long as no technical contradiction arises.

The content of the second process is not limited to the example according to the above embodiment. It is only necessary that the second process should include the following two elements. A first element is to start the update to the update software on condition that an update acceptance signal has been acquired in response to an advance notification when determining that an occupant is present in the vehicle cabin. A second element is to start the update to the update software without making an advance notification when determining that no occupant is present in the vehicle cabin. The content of the second process may be changed from that according to the above embodiment as long as these two elements are included. For example, the process in step S100 may be omitted. That is, the processes in and after S110 may be performed when the system of the vehicle 100 is turned on. In this case, an advance notification is made in step S120 for an occupant that is using the vehicle 100. When the occupant that has received the advance notification determines that the use of the vehicle 100 cannot be stopped immediately and operates the refusal button U3 in response to the advance notification (step S140: NO), a new scheduled date and time is determined (step S310, step S320). When the occupant that has received the advance notification determines that the use of the vehicle 100 may be stopped at that time and operates the acceptance button U2 (step S140: YES), meanwhile, the process proceeds as follows. That is, the update to the update software is performed (step S150) after waiting for the occupant to turn off the system of the vehicle 100.

The update to the update software may be performed when the system of the vehicle 100 is turned on, depending on the type of the specific control device 90 as the update target. In such a case, the update to the update software may be performed when the system of the vehicle 100 is turned on. When this is applied to the above modification, for example, the process proceeds as follows. That is, after the occupant that has received the advance notification while using the vehicle 100 operates the acceptance button U2 (step S140: YES), the update to the update software is performed without waiting for the occupant to turn off the system of the vehicle 100.

In the second process, the process flow to return to step S110 when the determination in step S130 is NO may be omitted. In this case, step S130 may be executed again when the determination in step S130 is NO. By reliably informing the occupant that an advance notification has been made by making notification sound when the advance notification is made, for example, it is possible to suppress the occupant getting off the vehicle without noticing the presence of the advance notification.

Regarding step S310 in the second process, the manner of calculating a scheduled date and time is not limited to the example according to the above embodiment. For example, a scheduled date and time may be calculated by adjusting only a date for a fixed time determined in advance. While a scheduled date and time may be calculated in any manner, a date and time at which the occupant is not using the vehicle 100 is preferably calculated as far as it is possible. As in step S310 in the second process, the manner of calculating a scheduled date and time in step S20 in the first process may also be changed from the above embodiment. The manner of calculating a scheduled date and time may be changed between step S20 in the first process and step S310 in the second process.

Non-volatile memories of the single-bank structure may be adopted as the non-volatile memories of the specific control devices 90. The memories of this type include only a single storage area, unlike those of the double-bank structure. Writing is not allowed when data are being read from these memories. Thus, the following configuration may be adopted when non-volatile memories of the single-bank structure are adopted. That is, the first process is ended when a distribution package is downloaded in step S30. Then, installation is performed in the second process. Then, installation is performed prior to update in step S150 in the second process.

As described in the above modification, the first process is not limited to the example according to the above embodiment. In addition to performing installation in the second process as in the above modification, downloading may not be performed in the first process and may be performed in the second process. Then, downloading, installation, and activation may be performed in step S150 in the second process. In this case, the first process includes only step S10 and step S20. Such changes may be made irrespective of the type of the non-volatile memories, whether the non-volatile memories are of the single-bank structure or the double-bank structure. The contents of the first process and the second process may be adjusted, as appropriate, so as to be able to implement the three processes, namely downloading, installation, and activation as update.

The timing to execute the first process is not limited to the example according to the above embodiment. For example, the first process may be performed after the lapse of a certain time after the system of the vehicle 100 is turned on. The first process may be performed while the system of the vehicle 100 is turned off.

Non-volatile memories of the double-bank structure may be adopted for some of the specific control devices 90, and non-volatile memories of the single-bank structure may be adopted for the remaining specific control devices 90.

Non-volatile memories of different structures may be adopted for a first memory and a second memory of an identical specific control device 90.

A single non-volatile memory may be used for both a first memory and a second memory of an identical specific control device 90.

The above modifications regarding the non-volatile memories are also applicable to the OTA master 10. That is, non-volatile memories of the single-bank structure may be adopted as the non-volatile memories of the OTA master 10. Non-volatile memories of different structures may be adopted for the first memory 21 and the second memory 22. A single non-volatile memory may be used for both the first memory 21 and the second memory 22.

The OTA master 10 may update software for the OTA master 10 itself using the same method as in the above embodiment. That is, the electronic control device as the target for software update by the OTA master 10 may be the OTA master 10 itself.

It is not essential that the second device that notifies an occupant that is present in the vehicle cabin of information and the third device that receives an instruction from the occupant should be constituted of an identical device.

The third device is not limited to the example according to the above embodiment. For example, the third device may be a push switch that operates mechanically. It is only necessary that the third device should be able to receive an instruction from an occupant and output a signal that matches an operation by the occupant to the OTA master 10.

The second device is not limited to the example according to the above embodiment. A speaker may be adopted as the second device. An advance notification may be made for an occupant using sound such as voice guidance. It is only necessary that the second device should be able to notify an occupant that is present in the vehicle cabin of information in response to an instruction from the OTA master 10.

The first device that detects the presence of an occupant in the vehicle cabin is not limited to the example according to the above embodiment. The first device may be a camera that captures an image of the inside of the vehicle cabin, for example. The first device may be a courtesy switch that detects opening and closing of a door. For example, it may be determined that the occupant has got off the vehicle when the door is opened and closed after the system of the vehicle 100 is switched from on to off. The first device may be an electronic key possessed by the occupant. The electronic key transmits a response signal in response to a request signal emitted by the OTA master 10 only when the electronic key is positioned in a wireless communication area in the vehicle cabin. The presence of an occupant in the vehicle cabin may be determined by confirming the position of the electronic key using such a response function. It is only necessary that the first device should be able to detect the presence of an occupant in the vehicle cabin.

The overall configuration of the vehicle 100 is not limited to the example according to the above embodiment. For example, the vehicle 100 may be a so-called battery electric vehicle that does not include an engine as a drive source for the vehicle 100.

The OTA master 10 may include a processing circuit that includes one or more processors that execute various processes according to a computer program (software). The OTA master 10 may include a processing circuit that includes one or more dedicated hardware circuits such as application specific integrated circuits (ASICs), or a processing circuit that includes a combination of the processors and the dedicated hardware circuits, that executes at least a part of the various processes. The processor includes a CPU and a memory such as a random access memory (RAM) and a read only memory (ROM). The memory stores a program code or an instruction configured to cause the CPU to execute a process. The memory, that is, a computer-readable medium, includes any available medium that is accessible by a general-purpose or special-purpose computer. The present modification is also applicable to the specific control devices 90.

What is claimed is:

1. An information processing device for a vehicle, the information processing device comprising one or more processors configured to:

receive update software for an electronic control device mounted on the vehicle;

determine whether a system of the vehicle, which is turned on or off by way of an ignition switch of the vehicle, is turned off;

when the system of the vehicle has been determined to be not off, do not perform an update of software of the electronic control device with the update software; and when the system of the vehicle has been determined to be off:

determine whether an occupant is present in a vehicle cabin of the vehicle;

make a notification before the update with the update software is started when having determined that the occupant is present in the vehicle cabin, the notification being made to allow the occupant to select whether to start the update with the update software; and start the update with the update software without making the notification when having determined that no occupant is present in the vehicle cabin.

2. The information processing device according to claim 1, wherein the one or more processors of the information processing device are further configured to:

make a notification of a candidate for a new scheduled date and time at which the update with the update software is to be performed when either (i) the system of the vehicle has been determined to be not off or (ii) the occupant of the vehicle has selected not to start the update.

3. A software update system for a vehicle, the software update system comprising:

a first device configured to detect presence of an occupant in a vehicle cabin of the vehicle;

a second device configured to notify the occupant present in the vehicle cabin of information by using light or sound;

a third device configured to receive an instruction from the occupant in the vehicle cabin;

an electronic control device mounted on the vehicle, and an information processing device mounted on the vehicle to control an update of software for the electronic control device, the information processing device being configured to:

receive update software for the electronic control device;

perform the update of the software of the electronic control device with the update software;

determine whether the occupant is present in the vehicle cabin based on a detection result from the first device;

when having determined that the occupant is present in the vehicle cabin, make a notification using the second device before the update with the update software is started, the notification being made to allow the occupant to select whether to start the update with the update software, and start the update with the update software on condition that a signal indicating that the update with the update software has been accepted is acquired from the third device after the notification is made, when having determined that no occupant is present in the vehicle cabin, start the update with the update software without making the notification; and make a notification of a candidate for a new scheduled date and time at which the update to the update software is to be performed using the second device when a signal indicating that the update with the update software has been refused is acquired from the third device after the notification is made.

4. A software update system for a vehicle, the software update system comprising:

a first device configured to detect presence of an occupant in a vehicle cabin of the vehicle:

a second device configured to notify the occupant present in the vehicle cabin of information by using light or sound;

a third device configured to receive an instruction from the occupant in the vehicle cabin;

an electronic control device mounted on the vehicle; and an information processing device mounted on the vehicle to control an update of software for the electronic control device, the information processing device being configured to:

receive update software for the electronic control device;

perform the update of the software of the electronic control device for the update software;

determine whether the occupant is present in the vehicle cabin based on a detection result from the first device;

when having determined that the occupant is present in the vehicle cabin, make a notification using the second device before the update with the update software is started, the notification being made to allow the occupant to select whether to start the update with the update software, and start the update with the update software on condition that a signal indicating that the update with the update software has been accepted is acquired from the third device after the notification is made:

when having determined that no occupant is present in the vehicle cabin, start the update with the update software without making the notification; and start the update with the update software when determining having determined that no occupant is present in the vehicle cabin any more based on the detection result from the first device in a state where the signal indicating that the update to with the update software has been accepted is not acquired from the third device after the notification is made.

5. A non-transitory storage medium storing instructions that are executable by an information processing device and that cause the information processing device to execute functions, the information processing device being mounted on a vehicle together with an electronic control device and configured to control an update of software for the electronic control device, the functions comprising:

receiving update software for the electronic control device;

determine whether a system of the vehicle, which is turned on or off by way of an ignition switch of the vehicle, is turned off;

when the system of the vehicle has been determined to be not off, not performing the update of the software of the electronic control device with the update software; and when the system of the vehicle has been determined to be off:

determining whether an occupant is present in a vehicle cabin of the vehicle;

making a notification before the update with the update software is started when having determined that the occupant is present in the vehicle cabin, the notification being made to allow the occupant to select whether to start the update with the update software; and starting the update with the update software without making the notification when having that no occupant is present in the vehicle cabin.

6. The non-transitory storage medium according to claim 5, wherein the functions further comprise:

making a notification of a candidate for a new scheduled date and time at which the update with the update software is to be performed when either (i) the system of the vehicle has been determined to be not off or (ii) the occupant of the vehicle has selected not to start the update.

* * * * *